Patented Sept. 27, 1932

1,879,324

UNITED STATES PATENT OFFICE

ERNST KOENIGS AND HEINZ GREINER, OF BRESLAU, GERMANY, ASSIGNORS TO WINTHROP CHEMICAL COMPANY, INC., OF NEW YORK, N. Y., A CORPORATION OF NEW YORK

PYRIDINE DERIVATIVES AND THE PROCESS OF PRODUCING THEM

No Drawing. Application filed July 23, 1930, Serial No. 470,242, and in Germany July 23, 1929.

The present invention relates to pyridine derivatives and to a process of preparing the same.

In accordance with our invention new 4-pyridyl-pyridinium compounds of the probable formula:

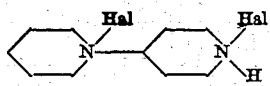

wherein Hal means a halogen atom, are produced by the condensation of two pyridine molecules with each other on reacting upon pyridine with a thionyl halogenide. When employing thionyl chloride as the condensing agent we presume that the process proceeds according to the following equation:

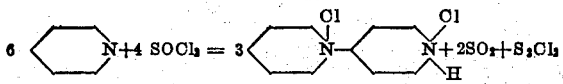

however we do not know for certain whether the thionyl chloride enters into the reaction in the indicated manner. The corresponding salt of hydrobromic acid is obtained when employing thionyl bromide as reacting agent.

The new compounds are generally crystalline products, soluble in water. They are valuable intermediate products for the manufacture of pyridine derivatives. Against diluted mineral acids they are generally stable. However, when warming the pyridyl-pyridinium salts with bases, for example, alkali- or alkaline-earth metal hydroxides, ammonia, aniline and the like, 4-aminopyridine and as by-product glutacone-aldehyde or derivatives thereof are obtained, probably according to the following equation:

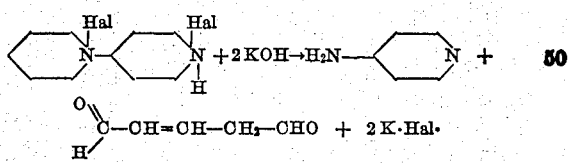

The aldehyde formed is generally further changed during the reaction, the kind of the reaction being dependent upon the kind of the base used. For example, when employing aniline as basic reacting agent, the decomposition proceeds probably according to the following equation:

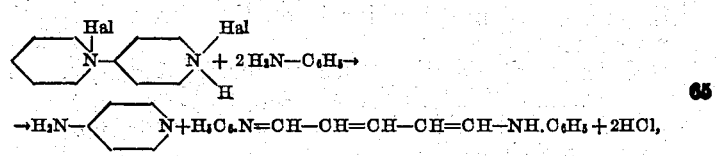

in this case forming the glutacone-dianile as a by-product.

The same reaction process is performed when a 4-pyridyl-pyridinium salt, after a preliminary treatment with alkalies in the cold, is heated with a diluted strong mineral acid. As alkalies may be used also in this case alkali- or alkaline-earth metal hydroxides, ammonia and the like.

For performing such decomposition of the 4-pyridyl-pyridinium salts it is not always necessary to isolate the latter in a pure form, rather, often it will be advantageous to decompose the raw-product obtained.

Our invention is illustrated by the following example, without being restricted thereto, the parts being by weight:

A mixture of 100 parts of pyridine with 300 parts of thionyl chloride is heated on the water bath during five hours, or left to react at the ordinary temperature for some days. Then the excess of thionyl chloride is distilled off under reduced pressure. It remains a dark mass which is made into a paste with a small amount of methyl alcohol and then sucked off while cooling with ice. The 4-pyridyl-pyridinium dichloride of the probable formula:

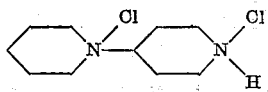

generally forms colorless crystals of melting point 171–172° C. Obviously it appears in two modifications, since sometimes a less stable form of melting point 151–152° C. has been obtained which is transformed into the crystals of melting point 171–172° C. by recrystallization from hot diluted hydrochloric acid or by standing for a longer time. The two modifications give the same chemical reactions, they are readily soluble in water and stable against diluted acids. The higher melting form yields when decomposed with picric acid a picrate of melting point 180–181° C. The aqueous solution is immediately colored deeply orange on adding an alkali and deposits a red substance after a longer standing or a short boiling.

The 4-pyridyl-pyridinium dichloride is transformed into 4-amino-pyridine by heating with the same quantity of caustic potash and a small amount of quick-lime to 200° C. during 15 minutes and by steam-distillation of the reaction mixture. By evaporating the distillate 4-amino-pyridine is obtained in a pure form.

Likewise, by heating with a concentrated aqueous ammonia solution the 4-pyridyl-pyridinium dichloride is decomposed to 4-amino-pyridine.

We claim:—

1. In the process of preparing 4-aminopyridine the step which comprises reacting upon pyridine with a thionyl halogenide.

2. In the process of preparing 4-aminopyridine the step which comprises reacting upon pyridine with thionyl chloride.

3. In the process of preparing 4-aminopyridine the step which comprises reacting upon pyridine with thionyl chloride while heating the mixture on the water-bath.

4. In the process of preparing 4-aminopyridine the steps which comprise reacting upon 100 parts by weight of pyridine with 300 parts by weight of thionyl chloride on the water bath during 5 hours and distilling off the excess of thionyl chloride under reduced pressure.

5. The process which comprises reacting upon pyridine with a thionyl halogenide and warming the intermediate product formed with an alkaline reacting agent.

6. The process which comprises reacting upon pyridine with a thionyl halogenide and treating the intermediate product formed with an alkaline reacting agent in the cold and heating the reaction mixture with a diluted strong mineral acid.

7. The process which comprises reacting upon pyridine with thionyl chloride and warming the intermediate product formed with an alkaline reacting medium.

8. The process which comprises reacting upon pyridine with thionyl chloride and treating the intermediate product formed with an alkaline reacting agent in the cold and heating the reaction mixture with a diluted strong mineral acid.

9. The process which comprises reacting upon pyridine with thionyl chloride and warming the intermediate product formed with an alkaline reacting medium of the group consisting of alkali- and alkaline-earth metal hydroxides and ammonia.

10. The process which comprises reacting upon pyridine with thionyl chloride and treating the intermediate product formed with an alkaline reacting agent of the group consisting of alkali- and alkaline-earth metal hydroxides and ammonia in the cold and heating the reaction mixture with a diluted strong mineral acid.

11. The process which comprises reacting upon pyridine with thionyl chloride and warming the intermediate product formed with a concentrated aqueous ammonia solution.

12. The process which comprises reacting upon 100 parts by weight of pyridine with 300 parts by weight of thionyl chloride on the water bath during 5 hours, distilling off the excess of thionyl chloride under reduced pressure, and heating the intermediate product formed with a concentrated aqueous ammonia solution.

13. The products of the probable general formula:

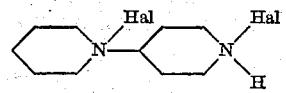

wherein Hal stands for a halogen atom, said products being generally crystalline substances, soluble in water, being valuable intermediate products for the manufacture of pyridine derivatives.

14. The product of the probable formula:

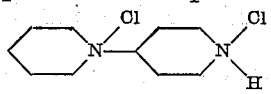

said product forming colorless crystals of melting points 171–172° C. or 151–152° C., being readily soluble in water and stable on treatment with diluted acids, decomposing when treated with alkaline reacting agents, being a valuable intermediate product for the manufacture of pyridine derivatives.

15. In the process of preparing 4-aminopyridine, the step which comprises reacting upon pyridine with thionylchloride at ordinary temperature for some days.

16. In the process of preparing 4-aminopyridine, the steps which comprise reacting upon 100 parts by weight of pyridine with 300 parts by weight of thionylchloride at ordinary temperature for some days and distilling off the excess of thionylchloride under reduced pressure.

17. The process which comprises reacting upon 100 parts by weight of pyridine with 300 parts by weight of thionylchloride at ordinary temperature for some days, distilling off the excess of thionylchloride under reduced pressure, and heating the intermediate product formed with a concentrated aqueous ammonia solution.

In testimony whereof, we affix our signatures.

ERNST KOENIGS.
HEINZ GREINER.